United States Patent [19]
Devera et al.

[11] Patent Number: 5,226,595
[45] Date of Patent: * Jul. 13, 1993

[54] VEHICLE PASSENGER COMPARTMENT TEMPERATURE CONTROL SYSTEM WITH MULTI-SPEED RESPONSE

[75] Inventors: Dennis Devera, Carol Stream; James Pearson, Downers Grove; Bruce Weatherhead, Wilmette; George Jarosch, Elk Grove, all of Ill.

[73] Assignee: Eaton Corporation, Cleveland, Ohio

[ * ] Notice: The portion of the term of this patent subsequent to Jul. 7, 2009 has been disclaimed.

[21] Appl. No.: 813,561

[22] Filed: Dec. 26, 1991

Related U.S. Application Data

[63] Continuation-in-part of Ser. No. 813,554, Dec. 26, 1991, Pat. No. 5,127,576.

[51] Int. Cl.⁵ .................... H25B 29/00; B60H 1/02; B60H 3/00
[52] U.S. Cl. .................. 237/2 A; 237/12.3 B; 165/39; 165/40; 165/43; 236/78 C; 236/78 D
[58] Field of Search ............ 237/2 A, 123 B; 236/78 C, 78 D; 165/42, 43, 40, 39

[56] References Cited

U.S. PATENT DOCUMENTS

| | | | |
|---|---|---|---|
| 4,739,923 | 4/1988 | Tsutsui | 236/78 C |
| 4,875,623 | 10/1989 | Garris | 236/78 D |
| 4,974,664 | 12/1990 | Glennon et al. | 237/2 A |
| 5,022,234 | 6/1991 | Goubeaux et al. | 236/78 D |
| 5,085,267 | 2/1992 | Torrence | 237/2 A |

FOREIGN PATENT DOCUMENTS

| | | | |
|---|---|---|---|
| 3215293 | 10/1982 | Fed. Rep. of Germany | 236/78 C |
| 0175415 | 10/1982 | Japan | 236/78 D |
| 0163102 | 8/1985 | Japan | 236/78 D |
| 0239310 | 10/1986 | Japan | 236/78 D |
| 0127820 | 5/1989 | Japan | 236/78 D |

Primary Examiner—John K. Ford
Attorney, Agent, or Firm—R. A. Johnston

[57] ABSTRACT

A system for controlling vehicle passenger compartment comfort. An electronic controller receives input from: (i) a thermistor array sensing blower plenum discharge temperature, (ii) a user movable Level Select Control (iii) a potentiometer sensing the position of a servo driven heater core water valve, (iv) an engine rpm tachometer generator and (v) a blower speed signal. The controller drives the servomotor for the water valve at a "High" rate until the valve position potentiometer indicates that the valve is within fifteen degrees (15°) of the target, whereupon the controller drives the servomotor at a "Low" speed.

11 Claims, 3 Drawing Sheets

VEHICLE PASSENGER COMPARTMENT TEMPERATURE CONTROL SYSTEM WITH MULTI-SPEED RESPONSE

CROSS REFERENCE TO RELATED APPLICATION

This application is a continuation-in-part of application Ser. No. 813,554, filed Dec. 26, 1991 in the names of Bruce Weatherhead, George Jarosch, and Thomas Glennon and entitled VEHICLE PASSENGER COMPARTMENT TEMPERATURE CONTROL SYSTEM now U.S. Pat. No. 5,127,576.

BACKGROUND OF THE INVENTION

The present invention relates to climate or temperature control of the air in a vehicle passenger compartment and particularly relates to control systems having a heat exchanger in the passenger compartment which receives a flow of engine coolant therethrough for tempering blower air discharged into the passenger compartment.

Vehicle passenger compartment temperature control systems of the aforesaid type are known to employ a blower duct or housing having at least an exothermic heat exchanger or heater core therein for heating blower air. If desired, a second endothermic heat exchanger or evaporator has been interposed upstream of the heater core for circulation of refrigerant therethrough for de-humidifying and cooling blower air before passage over the heater core. In these latter types of systems, it has been found that the temperature of the blower air discharging from the duct plenum into the passenger compartment may be controlled entirely by controlling flow of engine coolant through the heater core thereby eliminating the need for modulating flow of the refrigerant to the evaporator. The desirability of controlling the discharge temperature of the plenum air into the passenger compartment when the refrigerant is being circulated through the evaporator without the need for modulating refrigerant flow has been found to greatly simplify temperature control and comfort level in the vehicle passenger compartment. This is particularly true where it is desired to dehumidify the blower airstream by first cooling the air over the evaporator for condensation of moisture thereon and removal of the same from the blower airstream followed by heating the dehumidified stream to a desired temperature.

It has been particularly desired to provide such a system for tempering blower discharge air temperature in a vehicle passenger compartment wherein the modulation of the flow of coolant to the evaporator core is provided automatically in a manner which maintains the temperature of the air discharging from the blower plenum at a constant level irrespective of changes in the blower speed and the speed of the engine driven coolant pump. It has been particularly desirable to provide such an automatic control system wherein the flow of engine coolant to the heater core is controlled by a servomotor actuated valve.

In providing a control system for operating a servomotor actuated coolant valve to control flow to the heater core, it has been found particular difficult to maintain a constant temperature of discharge air over the heater core where the flow of coolant to the valve varies widely in response to the changes of engine speed between idle and maximum engine operating RPM. Accordingly, it has been desired to find a way or means of automatically controlling the flow of coolant to an automotive passenger compartment heater core to maintain the blower plenum discharge air at a constant temperature despite user selected changes in blower speed and wide swings in the rate of flow of coolant to the coolant valve controlling flow to the heater core inlet.

SUMMARY OF THE INVENTION

The present invention provides for automatic control of a servomotor actuated engine coolant or water valve for controlling flow to the passenger compartment heat exchanger or heater core for automatically controlling the temperature of blower discharge air into the passenger compartment for controlling the comfort level therein. The control system of the present invention may be employed in vehicle passenger compartment passenger systems having only a heater core or such systems combined with an air conditioning evaporator disposed in the blower stream ahead of the heater core. In either arrangement a thermistor array exposed in the blower air discharge plenum senses the temperature of the air flowing over the heater core and provides temperature signal to an electronic controller. The controller also receives signals from an engine driven tachometer generator and a feedback position sensor on the coolant valve. The electronic controller also receives temperature select input signals from a user control head and a blower speed signal. The controller generates the control signal for energizing the servomotor for moving the control valve.

The controller is operative to change the rate of movement of the valve servo from an initially high rate to a lower rate as the valve member approaches the target position for a given set of conditions to prevent overshoot and hunting.

The controller is preferably operative to employ proportional-integral-derivative strategy including adding an idle compensation factor when the engine driven pump speed is below a predetermined threshold for generating the control signal to the valve servomotor which strategy accommodates wide swings in the flow to the valve and changes in the blower speed selected by the user.

DETAILED DESCRIPTION

Figure 1:
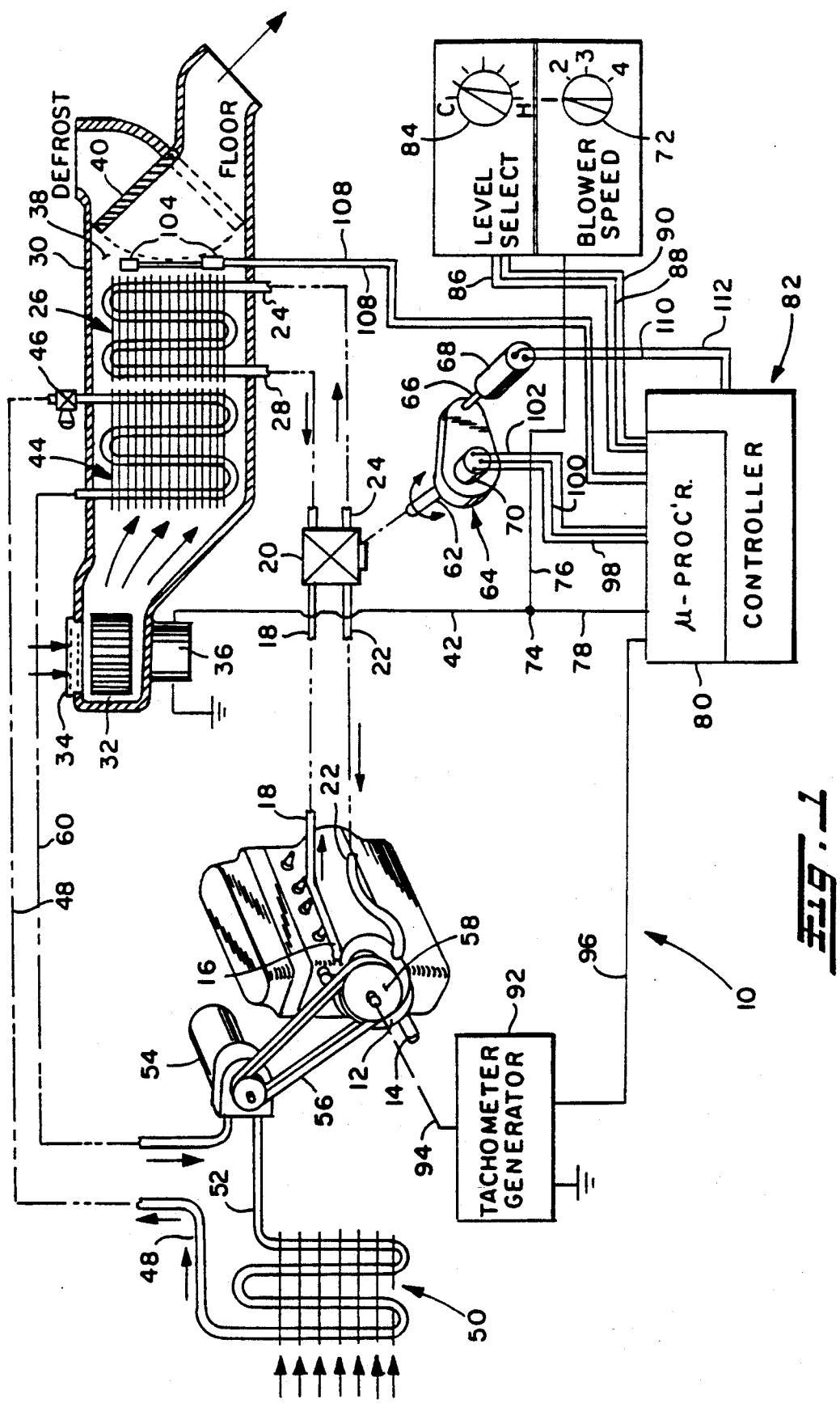
FIG. 1 is a pictorial schematic of the automatic control system of the present invention employed in a vehicle passenger compartment climate control application.

Referring to FIG. 1, the control system of the present invention employed in the vehicle passenger compartment climate control application is indicated generally at 10 wherein an engine driven water pump 12 receives engine coolant from a radiator (not shown) through inlet 14 and discharges coolant to the engine through internal passages therebetween (not shown). Water pump 12 has an auxiliary outlet 16 which provides the flow of heated engine coolant through conduit 18 to the inlet of a valve 20, which is preferably of the bypass type, having a return flow through conduit 22 to the inlet of the water pump. The valve 20 has a secondary outlet connected to discharge through conduit 24 which is connected to the inlet of heat exchanger or heater core indicated generally of 26 which is connected through conduit 28 to return flow to a secondary inlet of the valve 20.

Heater core 26 is typically disposed in a blower housing 30 which has blower 32 in end thereof drawing in air through filter 34 and which is driven by motor 36 for discharging air over the heater core 26 to a plenum region 38 in the housing 30. Plenum discharge is typically by a movable vane or mode select door 40, either to the passenger compartment via a conveniently located outlet, such as a Floor outlet or to an upper windshield Defrost outlet. Blower motor 36 has one lead thereof grounded to the vehicle power supply ground and the other side of the motor connected to a power lead 42.

Optionally, in vehicles equipped with an air conditioning system, an endothermic heat exchanger or evaporator 44 may be disposed in the blower housing 30 between the heater core 26 and the blower 32 for drying and cooling blower air prior to passing of the blower air over heater core 26. Evaporator 44 receives a flow of refrigerant from an expansion valve 46 connected to receive pressurized liquid refrigerant from conduit 48 connected to the discharge outlet of an ambient condenser, indicated generally at 50, and typically located in front of the engine cooled radiator, and which receives flow of pressurized refrigerant at its inlet from conduit 52 connected to the discharge outlet of a compressor 54. Compressor 54 is typically driven by a belt 56 connected to a pulley 58 on the crankshaft of the vehicle engine. Evaporator 44 has its discharge outlet connected through conduit 60 to return re-vaporized refrigerant to the suction inlet of compressor 54.

The heater core water valve 20 is operatively connected to be moved by a rotatable shaft 62 driven by a speed reducing means, indicated generally at 64, which is driven by an input shaft 66 connected to a servomotor 68.

A valve position sensor 70 is attached to the output shaft 62 of the speed reducing means; and, in the presently preferred practice the sensor 70 comprises a rotary potentiometer with its wiper connected to move with shaft 62.

A blower motor power lead 42 is connected to blower speed select control 72 via junction 74 and lead 76 with junction 74 connected through lead 78 to an input of a microprocessor 80 which forms a part of system controller which is indicated generally at 82.

A user operated LEVEL SELECT control 84 is operated to select the desired blower speed; and, control 84 is connected to separate inputs of the microprocessor 80 along leads 86,88,90. In the presently preferred practice, control 84 comprises a rotary potentiometer (not shown); however, any suitable device for providing variable voltage can be used.

A tachometer generator 82 is driven by the engine shaft as indicated by dashed line 94 and has one side of the coil thereof grounded with the remaining side connected via lead 96 to a separate input of the microprocessor 80 for providing an engine speed signal thereto.

The valve position potentiometer 70 connected to separate inputs of microprocessor 80 along leads 98,100,102 with the movable wiper thereof connected lead 100.

A blower discharge air temperature sensing means comprising at least one and preferably an array 104 of thermistors is provided in the plenum 38; and, the array 104 is connected along leads 106,108 to separate inputs of the microprocessor 80.

The controller 82 has its control signal output connected via leads 110,112 to opposite sides of the servomotor 68.

Figure 2:
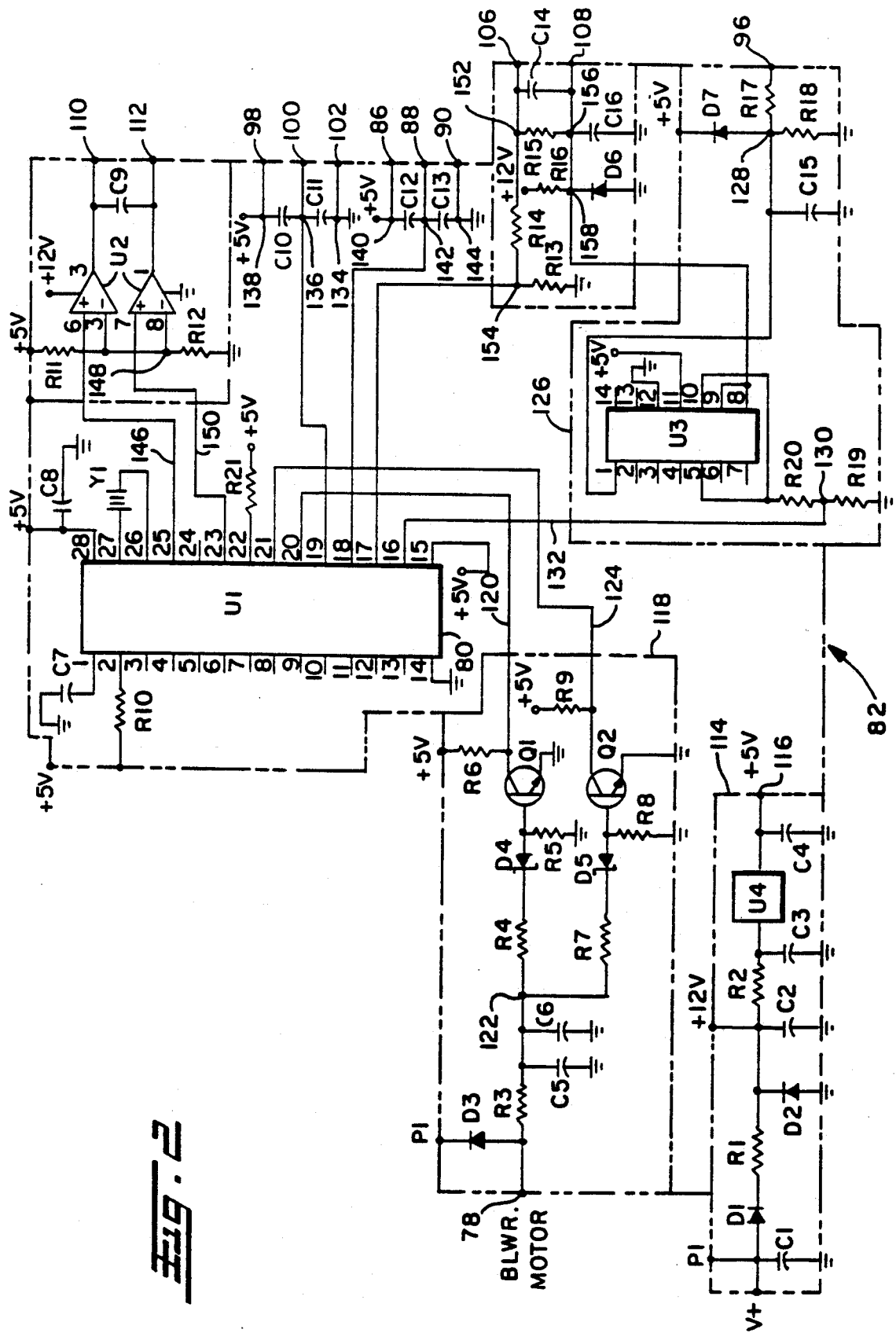
FIG. 2 is an electrical schematic of the controller of FIG. 1.

Referring to FIG. 2, controller 82 includes a power supply section 114 which provides a regulated five volt supply from the onboard vehicle voltage V+ through a network comprising diode D1 and resistor R1 surge protected by zener D2 and supplied through R2 to device U4 which in the presently preferred practice comprises a voltage regulator. The output of U4 at terminal 116 provides the five volt regulated voltage for the remaining system components.

Controller 82 includes a microprocessor 80 comprising device U1 available from Motorola, Schaumburg, Ill., bearing manufacturers designation MC68HC705P9. Controller 82 has a blower speed detection circuit 118 which receives the blower motor speed signal from lead 78 which is biased by the supply voltage P1 through reverse biased diode D3 and through series resistor R3 and R4 through zener D4 to the base of switch Q1 which has its collector biased through R6 and its emitter grounded. The collector junction of Q1 is connected through lead 120 of U1. The voltage between R3 and R4 is tapped at junction 122, and is supplied through series resistor R7 and reverse poled zener device D5 to the base of a second switch Q2, which has its emitter grounded and its collector junction biased through R9 and also connected along lead 124 to input pin 21 of U1.

In operation, when the blower motor voltage from lead 78 is LOW, devices Q1 and Q2 are OFF. When the blower voltage is raised to medium low, ML, zener D4 is avalanched and switches Q1 ON to pull the collector junction voltage down and thereby create a signal along lead 120. As the blower motor voltage increases to a medium high level, MH, or higher, zener D5 avalanches and Q2 conducts to pull down the voltage at its collector junction and sends a signal on lead 124 to the microprocessor U1. Thus, the detection circuit 118 provides three signal inputs to microprocessor U1 with the two switches Q1 and Q2.

The controller 82 includes a frequency-to-voltage converter 126 which receives the signal from tachometer generator lead 96 at its input which is applied through R17 to junction 128 which is also connected to reverse poled diode D7 and to the five volt supply and to pin 1 of a frequency-to-voltage converting device U3 which has pin 11 thereof which connection to the five volt regulated supply. In the present practice, device U3 is available from Motorola Semiconductor Corp., bearing manufacturer's designation LM2907. Pins 5 and 10 of the device U3 are connected through R20 to junction 130 which is grounded through R19 and is also connected through lead 132 to input pin 16 of the microprocessor U1. R20 and R19 thus comprise a voltage divider.

The valve position feedback potentiometer 70 receives power from the five volt supply along lead 98 and the wiper terminal of the potentiometer provides the signal to the microprocessor along lead 100 to pin 19 of U1. Lead 102 from the feedback potentiometer 70 is grounded through junction 134 which is connected through C11 to junction 136 and signal lead 100. The five volt supply is connected to lead 98 at junction 138 which is connected through C10 to junction 136.

The user operated Level Select control lead 86 is connected to junction 140 which is biased at five volts from the regulated power supply and connected through C12 to junction 142 which is also connected to the wiper lead of a potentiometer (not shown) within control 84. The remaining lead of the potentiometer in control 84 is connected through lead 90 to junction 144 which is grounded and connected through C13 to junction 142. Junction 142 is connected as a signal input to pin 18 of the microprocessor U1 for providing a level select position feedback signal thereto.

Microprocessor U1 provides its control signal outputs at pins 25 and 23 of the device U1 to the servomotor 68. Pin 25 of U1 is connected along lead 146 to the positive input of one half of operational amplifier U2 at pin 4 thereof, with the negative terminal at pin 3 connected at junction 148 to a reference voltage supply. R11 and R12 serve as a voltage divider to apply the reference voltage to junction 148. Pin 23 of U1 is connected through lead 150 to the positive input at pin 7 of the other half of the device U2 with the negative terminal connected to junction 148 and through R12 to ground. The output of one half of U2 at pin 3 thereof is connected to lead 110 for driving the motor in one direction; and, the output of the remaining half of amplifier U2 at pin 1 thereof is connected through lead 112 for driving the motor in the opposite direction, with leads 110 and 112 having C9 connected therebetween for transient suppression.

The blower air discharge temperature signal from the thermistor array to junction 154, which is provided along lead 106, is connected through R14 to junction 154 which is connected to pin 17 of microprocessor 80 and through R13 to ground. R14 and R13 serve as a voltage divider which feeds pin 17 through junction 154. Power is regulated to array 104 by zener D6. The thermistor array 104 has the remaining lead 108 connected through junction 156 which is connected through C16 to ground and to junction 158. Junction 158 is biased through R16 from a twelve volt supply and is connected through reverse poled zener diode D6 to ground. Junction 158 is also connected to pin 8 of the frequency-to-voltage device converter U3 for providing power thereto. C14 provides transient suppression between the thermistor leads 106 and 108.

Figure 3:
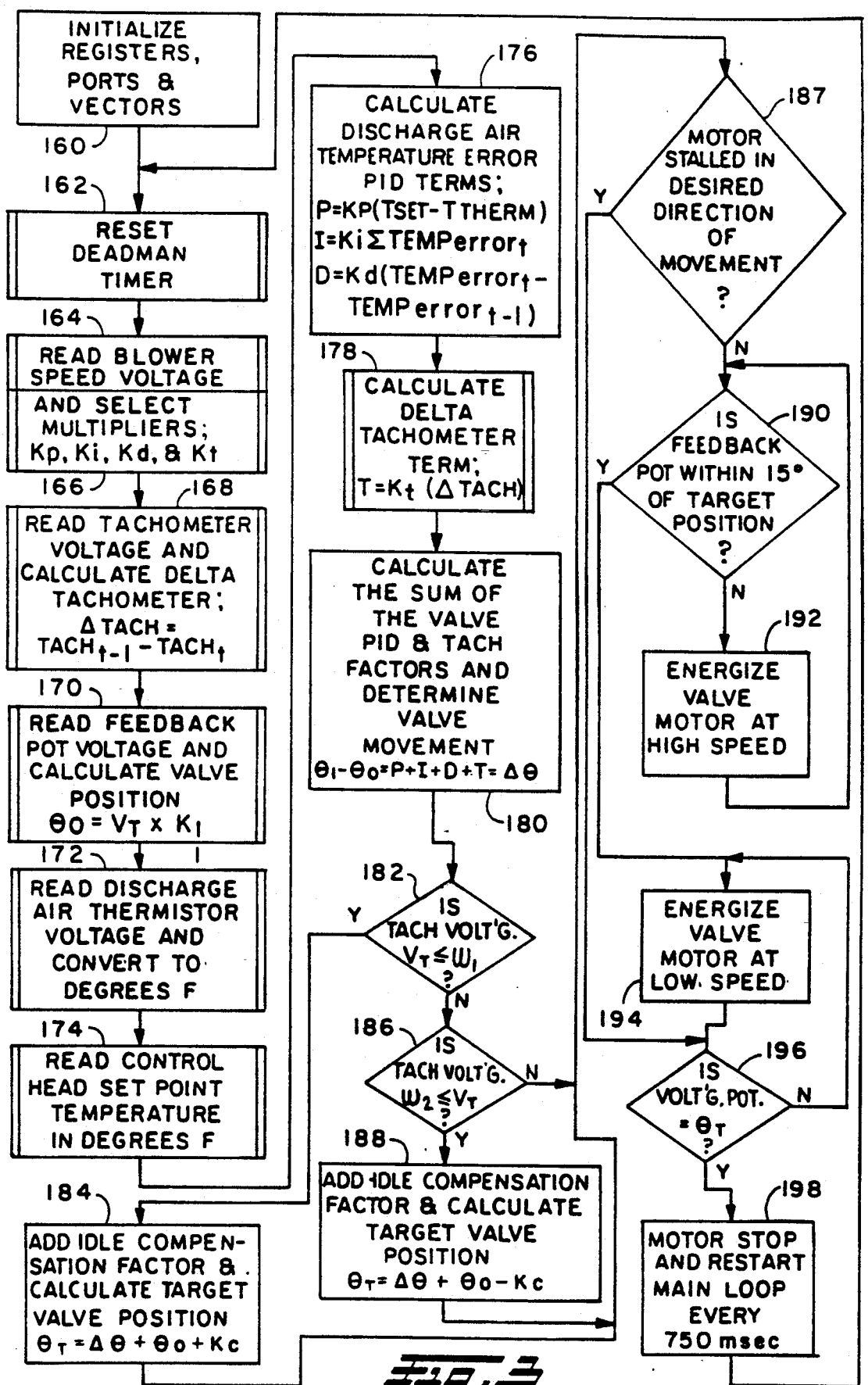
FIG. 3 is a block flow diagram of the control logic of the microprocessor employed in a controller of FIG. 2.

Referring to FIG. 3, the operation of the microprocessor 80 for generating the control signals to the servomotor 68 is shown in block diagram form wherein the circuitry is operative to initialize the registers, ports, and vectors at step 160 and then to reset a timer at step 162 and read to the blower speed voltage from lead 78 and produce one of the three combinations of switching signals from Q1 and Q2 at step 164.

The circuit then selects at step 166 the integer multipliers $K_P$ in the range 11 to 22, and preferably 15 to 22; $K_I$ as an integer in the range 9 to 20, and preferably 12 to 18; $K_D$ is a constant integer in the range 1 to 7, and preferably 3; and $K_T$ is an rpm gain constant integer in the range 1 to 7.

The circuitry then proceeds to step 168 and reads the voltage from the tachometer generator on line 96 and converts the variable frequency thereof to an analogue voltage signal supplied along lead 132 to pin 16 of the microprocessor. The circuitry at step 168 then calculates the following:

$$\Delta TACH = TACH_{i-1} - TACH_i.$$

The microprocessor 80 then proceeds to step 170, reads the valve position potentiometer voltage at junction 136 at pin 19 of U1 and calculates the valve position from the expression:

$\theta = V_T \times K_1$, where $K_1$ is a calibration constant determined at installation of the potentiometer on the speed reducer as to its wiper position 64 with respect to the position of shaft 62.

The circuitry then reads at step 172 the voltage from the thermistor array at junction 154 through pin 17 of U1 and converts the voltage to degrees F from a look-up table. The circuitry then proceeds to step 174, where the voltage from the Level Select control 84 is read from center lead 88 at junction 142 through pin 18 of the microprocessor and converts the voltage to degrees F from a look-up table.

The circuitry then proceeds to step 176 to calculate the discharge air temperature error PID terms as follows:

$$P: P = \frac{1}{K_P}(TEMP_{error}) = \frac{1}{K_P}(T_{set} - T_{therm});$$

I:

$$I = 1/K_I \times \Sigma TEMP_{error}$$

D: $D = K_D(TEMP_{error} - TEMP_{error-1})$

The microprocessor then calculates at step 178 the $\Delta TACH$ term:

$$T = K_T(\Delta TACH).$$

The microprocessor then calculates at step 180 the sum of the P, I, D, and Tachometer generator factors and determines the valve movement from the expression:

$$\theta_1 - \theta_0 = P + I + D + T = \Delta\theta.$$

The microprocessor then asks the question at step 182 whether the tachometer generator voltage $V_T$ is equal to or less than $\omega_1$, which is an idle threshold speed to determine whether the engine speed is below a first threshold value and if this is true, the circuitry proceeds directly to step 184. In the present practice, $\omega_1$ is 1,000 rpm for the engine. If, however, the test at step 182 determines that $V_T$ is not less than or equal to $\omega_1$, the microprocessor then proceeds to step 186 and takes the test to determine whether the tachometer generator voltage $V_T$ is equal to or greater than a second threshold value $\omega_2$. If the test at step 186 determines that $V_T$ is not equal to or greater than $\omega_2$, the circuitry proceeds directly to step 187; however, if $V_T$ is equal to or greater than $\omega_2$, the microprocessor proceeds to step 188. In the present practice, $\omega_2$ is 1,200 rpm for the engine. The negative idle compensation factor is added at step 188, and the target valve position is calculated according to the expression:

$$\theta_T = \Delta\theta + \theta_0 - K_C,$$

where $K_C$ is an idle speed compensation factor representative of about 15° of valve movement where full travel of the valve is 90°. The system then proceeds to step 187.

At step 182, if the voltage $V_T$ is less than or equal to $\omega_1$, the microprocessor proceeds to step 184 to add an idle compensation factor and calculate the target valve position from the expression:

$$\theta_T = \Delta\theta + \theta_0 + K_C.$$

The microprocessor then proceeds directly to step 187 and makes the determination whether the motor is stalled in the desired direction of movement. If the test at step 187 indicates that the motor is stalled in the desired direction of movement, the microprocessor proceeds directly to step 198 to stop the motor and impart a 750 millisecond delay before returning to step 162.

If at step 187 it is determined that the motor is not stalled in the desired direction of movement, the microprocessor then proceeds to step 190 where a determination is made as to whether the potentiometer wiper is within fifteen degrees (15°) of the target valve position called for by the controller. If the determination at step 190 is negative, the microprocessor proceeds to step 192 and energizes the valve servomotor to a "High" speed rate, whereupon the microprocessor returns to step 190 and repeats the cycle until a positive determination is made at step 190. Upon the potentiometer wiper reaching 15° of the control signal target, as determined at step 190, the controller energizes the valve servo motor at a "Low" speed at step 194 to prevent overshoot and hunting.

The microprocessor 80 then makes a determination at step 196 whether the potentiometer voltage at junction 136 is equal to a value corresponding to $\theta_T$, the instantaneous target position of the valve; and, if this is the case, the microprocessor proceeds to step 198. However, if at step 196 the feedback potentiometer voltage at junction 136 is determined not to be equal to $\theta_T$, then the circuitry returns to step 194 and continues energization of the valve motor at the "Low" speed.

It will be understood that the control signal is thus the sum of all the factors and may be expressed: $CS = P + I + D + T + C$ where $C = +K_C$ when engine speed falls below $\omega_1$ and $C = -K_C$ when engine speed rises above $\omega_2$. A separate determination of the control signal is made for each user selected blower speed. It will further be understood that $K_I$ is calculated only for the case $P = 0$.

Values of resistors, capacitors, and solid state devices are given below in Table I.

TABLE I

| Resistances: | | Capacitances: | | Other Devices: | |
|---|---|---|---|---|---|
| No. | Ohms | No. | MicroFarads | No. | Designations |
| R1 - 10 | | C1 - 0.1 | | U1 - MC68HC705P9 | |
| R2 - 100 | | C2 - 47 | | U2 - TCA0372DP1 | |
| R3 - 1K | | C3 - 0.1 | | U3 - LM2907 | |
| R4 - 1K | | C4 - 0.1 | | U4 - 78M05, .5 amp | |
| R5 - 1K | | C5 - 10 | | D1 - 1N4004 | |
| R6 - 10K | | C6 - 0.1 | | D2 - ZENER, P6KE30C | |
| R7 - 10K | | C7 - 1 | | D3 - 1N4148 | |
| R8 - 10K | | C8 - 0.01 | | D4 - 1N5229, 4.3 V | |
| R9 - 10K | | C9 - 0.1 | | D5 - 1N5236, 7.5 V | |
| R10 - 330 | | C10 - 0.01 | | D6 - ZENER, 9.1 V | |
| R11 - 10K | | C11 - 0.01 | | D7 - 1N4148 | |
| R12 - 10K | | C12 - 0.01 | | Y1 - 4.00 MHz | |
| R13 - 130K | | C13 - 0.01 | | Q1 - 2N3904 | |
| R14 - 3.6K | | C14 - 0.001 | | Q2 - 2N3904 | |
| R15 - 130K | | C15 - 0.022 | | | |
| R16 - 240 | | C16 - 0.001 | | | |
| R17 - 87K | | | | | |
| R18 - 20K | | | | | |

TABLE I-continued

| Resistances: | | Capacitances: | | Other Devices: | |
|---|---|---|---|---|---|
| No. | Ohms | No. | MicroFarads | No. | Designations |
| R19 - 5.6K | | | | | |
| R20 - 4.3K | | | | | |
| R21 - 330 | | | | | |

The present invention thus provides a unique and novel controller for a vehicle passenger compartment climate control system employing a servomotor driven valve for controlling throttle flow to the heater core for exothermic heat exchange. The present invention employs an electronic controller for the servo driven valve wherein the controller drives a control signal based upon temperature inputs from a thermistor disposed in the blower plenum, a valve position potentiometer, and a tachometer generator sensing engine speed and a user temperature level select input. The electronic controller drives the control signal based upon proportional, integral, and derivative factors with respect to changes in discharge air temperature and does so for each user-selected blower speed. The present invention accommodates wide swings in engine coolant flow to the heater core and particularly differences between engine idle and high speed engine operation by adding an idle speed compensation factor to the control signal when engine rpm is at or near idle.

When the valve position is greater than about 15° of the target position for a given value of control signal, the controller drives the servo motor at an initial fast rate; and, when the valve is within 15° of the target position, the controller drives the servo motor at a second rate substantially shower than the initial rate to minimize overshoot and hunting.

Although the invention has hereinabove been described with respect to the illustrated embodiments, it will be understood that the invention is capable of modification and variation, and is limited only by the following claims.

We claim:

1. A system for automatically controlling temperature in a vehicle passage compartment comprising:
   (a) exothermic heat exchanger means including engine driven pump means having the speed thereof varying with engine speed connected for circulation of heated fluid therethrough;
   (b) valve means connected for receiving said fluid including a valve member movable for controlling flow of said fluid through said heat exchanger means;
   (c) servomotor means operable upon energization to effect movement of said movable valve member;
   (d) blower means including duct means operable to effect a flow of air over said heat exchanger means including plenum means to direct said flow downstream of said heat exchanger means to said passenger compartment;
   (e) sensor means disposed in said flow on the downstream side of said heat exchanger means and operative to sense the temperature of said air flow to said passenger compartment and provide an electrical signal indicative thereof;
   (f) means operative to sense the position of said valve member and provide an electrical feedback signal indicative thereof;

(g) temperature select means operative upon user actuation to provide an electrical temperature set signal;

(h) flow rate means operative to provide electrical signal indicative of the varying rate of fluid flow in said heat exchanger means;

(i) control circuit means including microcomputer means operative in response to said airflow temperature signal, said feedback signal, said set signal and said fluid flow to generate a control signal for energizing said servomotor means; and, (j) said control circuit means operative to add an idle compensation factor to said control signal at a fluid flow below a first threshold, and said circuit means operative for subtracting an idle compensation factor from said control signal at a fluid flow greater than a second threshold, said microcomputer means employing a P.I.D. algorithm for processing said airflow and set temperature signals to produce said control signal, said servomotor means energized at a first rate responsive to an indication of said valve member being less than a predetermined angular position from a target position and energized at a second rate significantly different from said first rate responsive to an indication of said valve member being greater than a predetermined angular position from said target position.

2. The system defined in claim 1, wherein said servomotor means includes a motor and speed reducer means.

3. The system defined in claim 1, wherein said means operative to sense said valve member position including potentiometer means.

4. The system defined in claim 1, wherein said pump means is driven by the vehicle engine and said first threshold is near engine idle speed.

5. The system defined in claim 1, wherein said sensor means includes at least one thermistor.

6. The system defined in claim 1, wherein said valve member is rotatably movable; said feedback means includes a rotary potentiometer; and, said microcomputer means is operative to generate a control signal for operating said servomotor at said first rate when said potentiometer is within fifteen degrees (15°) of said target position.

7. The system defined in claim 1, wherein said flow rate sensor means comprises pump speed sensing means.

8. The system defined in claim 1, wherein said pump means comprises an engine driven pump; and, said flow rate sensor means comprises an engine speed sensing means.

9. The system defined in claim 1, wherein said pump means comprises an engine driven pump; said pump means comprises an engine speed sensing means; and, said first threshold corresponds to an engine speed of about 1,000 rpm and said second threshold corresponds to an engine speed of about 1,200 RPM.

10. A system for automatically controlling air in a vehicle passenger compartment comprising:

(a) exothermic heat exchanger means including engine driven pump means having the speed thereof varying with engine speed connected for circulation of heated fluid therethrough;

(b) valve means connected for receiving said fluid including a valve member movable for controlling flow of said fluid through said heat exchanger means;

(c) servomotor means operable upon energization to effect movement of said movable valve member;

(d) blower means including duct means operable to effect a flow of air over said heat exchanger means including plenum means to direct said flow downstream of said heat exchanger means to said passenger compartment;

(e) sensor means disposed in said flow on the downstream side of said heat exchanger means and operative to sense the temperature of said air flow to said passenger compartment and provide an electrical signal indicative thereof;

(f) feedback means operative to sense the position of said valve member and provide an electrical feedback signal indicative thereof;

(g) temperature select means operative upon user actuation to provide an electrical temperature set signal;

(h) means sensing said pump speed and operative to provide an electrical flow rate signal;

(i) control circuit means including microcomputer means operative in response to receive said airflow temperature signal, said feedback signal, and said set signal and in response thereto operative in accordance with a preselected strategy including adding an idle compensation factor when said pump speed is less than a predetermined threshold to compute a control signal for driving said valve position servomotor means to regulate said airflow temperature about said set temperature irrespective of changes in coolant flow and air blower speed; and, (j) said control circuit means employing a P.I.D. algorithm for processing said airflow and set temperature signals to produce said control signal for energizing said servo motor means at a fast rate when said valve position member is positioned at or more than a preset threshold amount away from a target position and operative for energizing said servo motor means at a low rate when said valve position is positioned less than said preset threshold amount away from said target position.

11. The system defined in claim 10, wherein said valve means has a rotating valve member; and, said preset amount is an angular position of about fifteen degrees (15°).

* * * * *